Jan. 27, 1953     T. W. BOHMKER     2,626,497
LIFTER FOR BEET HARVESTERS
Filed Jan. 3, 1949
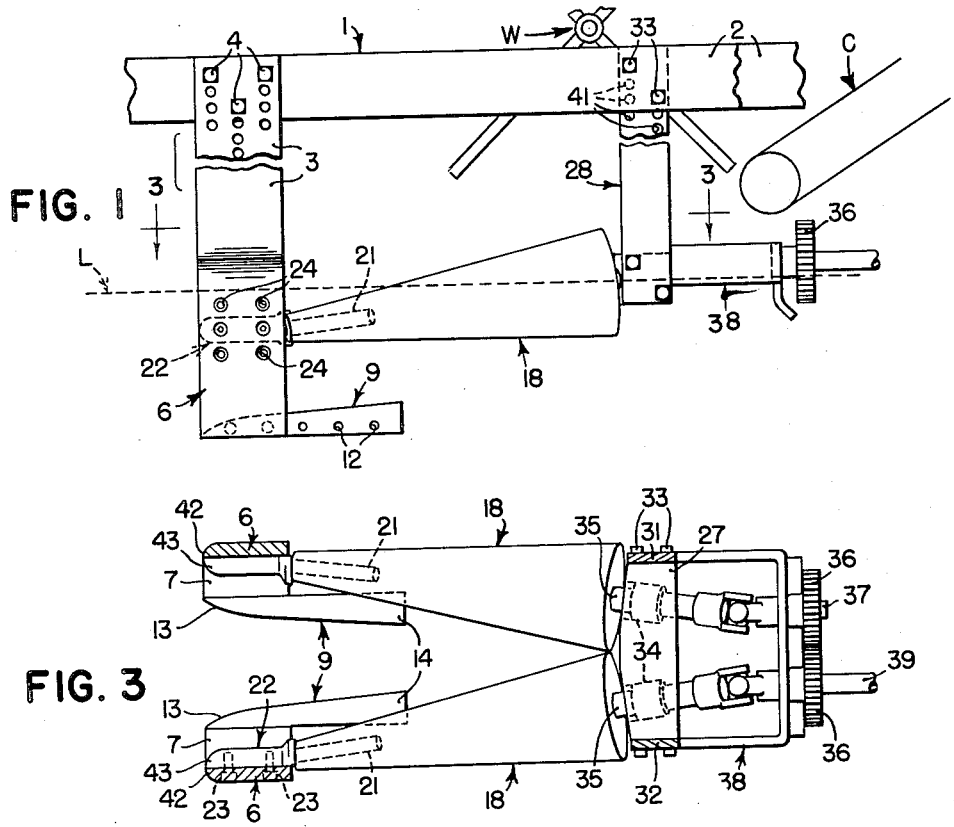
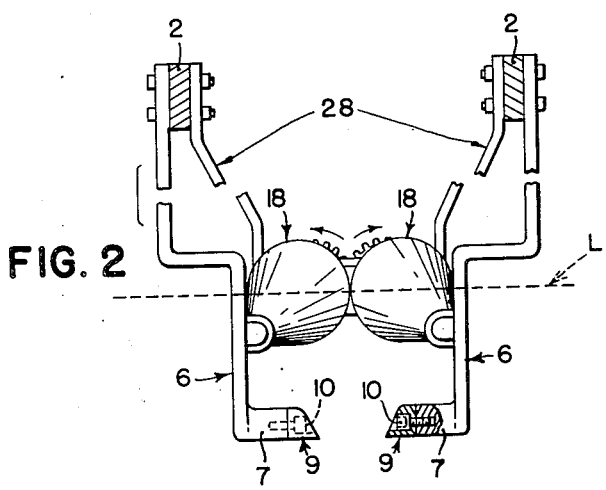
INVENTOR.
THOMAS W. BOHMKER
BY
ATTORNEYS Patented Jan. 27, 1953

2,626,497

UNITED STATES PATENT OFFICE 2,626,497

LIFTER FOR BEET HARVESTERS

Thomas W. Bohmker, Geneseo, Ill., assignor to Deere & Company, Moline, Ill., a corporation of Illinois Application January 3, 1949, Serial No. 68,805

2 Claims. (Cl. 55—106)

The present invention relates generally to agricultural implements and more particularly to root crop machines, such as sugar beet harvesters or the like.

The object and general nature of the present invention is the provision of a new and improved beet-lifting unit particularly adapted for beet harvesters operating to lift the bodies of the beets from the ground after the beets have been topped and the top foliage, together with any portions of the beet crowns removed during the topping operation, has been taken care of by suitable means.

More specifically, it is an important feature of this invention to provide a beet-engaging or lifting unit which includes a pair of laterally spaced, ground-entering supports upon which the forward ends of two vertically spaced pairs of beet-engaging and lifting elements are carried, whereby any tendency for the pressure of the soil, through which both sets of lifting elements are propelled during the harvesting operation, to move the upper and lower beet-engaging and lifting elements out of proper relation one with respect to the other is substantially eliminated. A further feature of this invention includes the provision of upper rotatable elements in the form of beet-engaging conical members arranged with their small ends forward and in diverging relation and supported so that the rear or larger ends of the conical members are in substantial contact, whereby the smaller beets, which are engaged by the portions of the conical members of larger diameter, are propelled upwardly and out of the ground at an increased velocity, and in this connection, it is a further feature of the invention to provide lower beet-engaging elements which are spaced somewhat closer together than the forward portions of the forwardly diverging conical elements but mounted substantially directly underneath the forward portions of said rotatable elements. By virtue of this construction the machine is enabled to handle efficiently the larger sizes as well as the smaller sizes of beets without loss.

These and other objects and advantages of the present invention will be apparent to those skilled in the art after a consideration of the following detailed description, taken in conjunction with the accompanying drawings, in which:

Figure 1 is a fragmentary side view of a portion of a beet harvester in which the principles of the present invention have been incorporated;

Figure 2 is a front elevation of the forward end of the beet lifting unit shown in Figure 1, certain parts being shown in section;

Figure 3 is a sectional view taken generally along the line 3—3 of Figure 1.

Referring now to the drawings, the beet-engaging and lifting unit of the present invention is illustrated as incorporated in a beet harvester having a lifting frame 1 which is made up of two generally fore and aft extending frame bars 2. A pair of forward laterally spaced supports 3 are fixed, as at 4, at their upper ends to the frame bars 2 respectively. Each of the supports 3, which are disposed in a generally vertical position, includes a central portion that is offset laterally inwardly, relative to the upper end, forming thereby a lower laterally inwardly disposed section 6 the lower ends of which are inturned, as at 7. A pair of laterally spaced beet-engaging and lifting points 9 are fixed, as by bolt means 10, to the inturned portions 7, and each lower fixed point or member 9 is provided with a plurality of openings 12 to provide for different fore and aft positions of the lower fixed point members 9. Each of the latter members includes a forward pointed portion 13 and a rear slightly thicker section 14. The sections 13 and 14 are joined together in a smooth curve, and the forward section 13 is normally fixed to the lower end portion 6 of the associated support 3. As best shown in Figure 3, the lower point members 9 converge rearwardly and, as best shown in Figure 1, the point members 9 are disposed in a generally horizontal position.

Cooperating with the lower beet-engaging and lifting point members 9 is an upper pair of laterally spaced beet-engaging and lifting members 18, each preferably in the form of a conical member arranged with its small end forward and its larger end rearward. The forward end of each of the conical members 18 is carried on the associated support 3 by means of a stud 21 carried by or formed on a bracket 22 fastened by socket screws 23 received in a pair of the plurality of pairs of openings 24. The brackets 22 may be raised or lowered to increase or decrease the distance between the upper and lower points.

The conical beet-engaging and lifting members 18 are arranged with their axes extending upwardly and converging rearwardly, as best shown in Figures 1 and 3, the angularity being such that the lower portions of the conical members are tangent to a substantially horizontal plane and the rear or larger portions of the conical members are in substantial contact, the forward or smaller portions of the conical members being spaced apart laterally a distance farther than the lower fixed points or beet-engaging elements 9 which are directly thereunder. It will be noted particularly from Figure 2 that the studs 21 are carried by the soil-engaging portions of the supports 3 an appreciable distance below the ground line L in operation, whereby a major portion of the rotatable elements 18 operates under the surface of the ground. However, since the lower portions of each of the conical members 18 are disposed horizontally, the larger or rear sections of the conical members 18 serve somewhat as the heel of a plow bottom to prevent the lifter unit from running too deep. It will also be noted that the forward ends of both the upper and lower beet-engaging and lifting members are rigidly supported in definite spatial positions by virtue of both being carried on the lower ground-entering portions of the supports 3, whereby these parts are rigidly held against displacement due to soil pressure against the forward ends of the beet-engaging and lifting members.

The rear ends of the rotatable upper beet-engaging and lifting members are held against displacement by virtue of a bearing block 27 which is supported at the lower end of a U-shaped support member 28 having laterally spaced sections 31 and 32 fixed to the frame bars 2, as by bolts 33. The bearing block 27 is fixed to the support member 28 in any suitable way and by virtue of bearing means 34 receives and holds in proper position the shafts 35 upon which the rear ends of the conical members 18 are fixed. The members 18 are caused to rotate in opposite directions by virtue of associated bevel gears 36 which intermesh and which are fixed, respectively, to shaft sections 37 carried in a frame 38 fixed to the support 28. The latter is provided with a plurality of openings 41 to receive the bolts 33 so as to provide for raising and lowering the frame 28 to accommodate any raising and lowering of the cone brackets 22 relative to the front support 3. One of the shafts 37 may be extended rearwardly as at 39, to be connected to a suitable source of power. Beets are taken from the conical rollers 18 by any suitable means, such as a beet engaging wheel W and conveyor C, which may be like that shown in the U. S. patent to Hruska, No. 1,505,957, dated August 26, 1924.

In operation, the unit 1 is lowered until both upper and lower points are operating substantially entirely underneath the surface of the ground, as shown in Figure 1. The lower fixed beet lifting members 9 are spaced closer together than the forward ends of the upper conical members 18 and serve to break up the ground, loosen the beets and lift them up to a point where they may be engaged by the conical lifting members 18. The forward edge portions of the support 3, especially the lower sections 6 thereof, are shaped to provide a sharpened soil-entering edge 42, and the front ends of the brackets 22 are also rounded or beveled in a similar manner, as shown at 43. It will also be noted, particularly from Figure 3, that the support arms 3 are relatively narrow parts and do not offer excessive resistance to being propelled through the ground. However, the lower ground-entering portions 6 of the support 3 serve to open a path for the passage under the ground of the conical members 18. The larger beets are normally engaged by the smaller portions of the rotatable conical members, and the smaller beets are engaged by the rearward portions of the conical members. Since these portions of the conical members are of larger diameter than the forward portions, the smaller beets are thus projected upwardly at a velocity that is somewhat greater than the upward velocity imparted to the larger beets by the front portions of the conical members 18. Since the rear ends of the conical members are held substantially in contact, even the smallest beets are efficiently handled by the conical members without losing any objectionable numbers of the beets.

Any suitable means may be provided for receiving the beets from the upper conical members 18.

While I have shown and described above the preferred form of the present invention it is to be understood that my invention is not to be limited to the particular details shown and described above, but that, in fact, widely different means may be employed in the practice of the broader aspects of my invention.

What I claim, therefore, and desire to secure by Letters Patent is:

1. In a beet harvester, a frame, beet lifting means comprising a pair of laterally spaced, generally vertically extending supports shaped to enter the ground and fixed at their upper ends to said frame, a pair of laterally spaced lower lifting points fixed at their forward ends to the lower ends of said supports and extending rearwardly therefrom, a pair of laterally spaced upper rotatable lifting elements, and bearing means carried by said supports above and laterally outwardly of the forward portions of said lower fixed lifting points and rotatably receiving and supporting the ends of said rotatable lifting elements, the distance between the forward portions of said lower fixed lifting points being less than the distance between the forward portions of the upper rotatable lifting elements and the distance between the rear portions of said lower fixed lifting points being greater than the distance between the rear portions of said upper rotatable lifting elements, whereby said lower fixed points tend to loosen the ground about the beets adjacent the lower parts thereof and the rotatable lifting elements, at their rear portions, are in a position to engage the smaller lower portions of each beet and raise the same upwardly of the ground, each of said supports including a generally central portion, offset laterally inwardly relative to the upper end thereof and receiving one of said bearing means, and a lower portion offset laterally inwardly relative to said central portion and receiving the forward end of the associated lower lifting point.

2. In a beet harvester, a frame, beet lifting means comprising a pair of laterally spaced, generally vertically extending supports shaped to enter the ground and fixed at their upper ends to said frame, a pair of laterally spaced lower lifting points fixed at their forward ends to the lower ends of said supports and extending rearwardly therefrom, a pair of laterally spaced upper rotatable lifting elements, and bearing means carried by said supports above and laterally outwardly of the forward portions of said lower fixed lifting points and rotatably receiving and supporting the ends of said rotatable lifting elements, the lower ends of said supports having laterally inwardly turned portions, and means fixing said lower lifting points to the laterally inner ends of said portions.

THOMAS W. BOHMKER.

REFERENCES CITED

The following references are of record in the file of this patent:

UNITED STATES PATENTS

| Number | Name | Date |
| --- | --- | --- |
| 1,263,529 | Coppins | Apr. 23, 1918 |
| 1,269,789 | Courtney | June 18, 1918 |
| 2,385,895 | Tramontini | Oct. 2, 1945 |
| 2,528,806 | Walz et al. | Nov. 7, 1950 |